United States Patent [19]

Tamura et al.

[11] 4,107,098

[45] Aug. 15, 1978

[54] ANION-EXCHANGE RESINS

[75] Inventors: Noriyoshi Tamura; Kunio Kihara, both of Amimachi, Japan

[73] Assignee: Mitsubishi Petrochemical Company Limited, Japan

[21] Appl. No.: 805,566

[22] Filed: Jun. 10, 1977

[30] Foreign Application Priority Data

Jun. 12, 1976 [JP] Japan .................................. 51-68861

[51] Int. Cl.$^2$ ......................... C08F 8/30; C08G 59/00
[52] U.S. Cl. .................................. 521/25; 210/500 R; 260/2.1 E; 528/499; 528/103; 528/407; 521/28
[58] Field of Search ........................ 260/2.1 R, 2.1 E

[56] References Cited

U.S. PATENT DOCUMENTS 2,630,429  3/1953  Hwa .................................. 260/2.1 E

Primary Examiner—Stanford M. Levin
Attorney, Agent, or Firm—Robert E. Burns; Emmanuel J. Lobato; Bruce L. Adams

[57] ABSTRACT

Strong base, anion-exchange resins in which an imidazole compound is utilized as a source of the anion-exchange groups. The imidazole compound is utilized as or through the reaction product thereof with an epoxy compound.

12 Claims, No Drawings

ANION-EXCHANGE RESINS

BACKGROUND OF THE INVENTION

This invention relates generally to anion exchange resins and more particularly to the production of anion exchange resins having basic ion exchange groups based on imidazoles and the production of anion exchange membranes containing in dispersed state these anion exchange resins.

More specifically, this invention relates to a process for producing strongly basic exchangers which, by not utilizing aliphatic tertiary amines in the formation of the anion exchange groups, have been improved particularly with respect to the production process, environmental sanitation, and heat resistance of the product.

Heretofore, a typically representative, strongly basic exchange resin has been one containing a quaternary ammonium salt as the ion exchange group. This quaternary ammonium salt is formed by causing an aliphatic tertiary amine (particularly trimethylamine) to react with a haloalkyl group (particularly a chloromethyl group) introduced onto a cross-linked polymer (e.g., an addition polymer, a polyaddition polymer, or a polycondensation polymer).

The methods of producing these strongly basic exchange resins known heretofore have been accompanied by a number of problems as described below.

First, the production processes in the known methods, in general are complicated. More specifically, a most typical strongly basic exchange resin is produced by chloromethylating a cross-linked polymer (e.g., a polystyrene cross-linked with divinylbenzene) and converting the resulting product into a quaternary ammonium salt. However, it is necessary to carry out chloromethylation in the presence of a suitable solvent and a suitable catalyst, and this requirement and the necessity of removing the solvent and the catalyst give rise to complications in the process. Furthermore, trimethylamine is generally used for this conversion into a quaternary ammonium salt, but its use is not desirable for reasons of work environment, because this amine is highly malodorous.

Another problem encountered in the practice of the method of this character, in which an aliphatic tertiary amine, particularly trimethylamine, is used in the formation of an anion exchange group is the poor heat resistance of the strongly basic exchange resin obtained as the product. In the present state of the art and related industries, in which the use of strongly basic exchange resins under high temperatures is frequently required, as the range of applications of these resins expands, inadequate heat resistance not only imposes various restrictions on the uses of these resins but also gives rise to problems in the secondary working processes thereof.

More specifically, as one example of use of an ion exchange resin, the case wherein such a resin is used in the form of a membrane may be considered. One method of producing an ion exchange membrane comprises dispersing a finely particulate ion exchange resin in a thermoplastic resin matrix in membrane form. In this method, however, the membrane is produced by heating and melting (e.g., at a temperature of 180° to 230° C) the thermoplastic resin containing the dispersed ion exchange resin; if the ion exchange resin has poor heat resistance, it cannot withstand such heating and melting.

A heterogeneous ion exchange membrane obtained by dispersing a finely particulate ion exchange resin in a thermoplastic resin membrane matrix is satisfactory with respect to production cost, strength of the membrane, and handling characteristic in comparison with a homogeneous ion exchange membrane (specifically, produced by chloromethylating a cross-linked polymer membrane and converting it into a quaternary ammonium salt with an amine, such as trimethylamine), which is the structure obtained by rendering the ion exchange resin, itself, into membrane form. Accordingly, it can be said that poor heat resistance of an ion exchange resin to be dispersed is a great disadvantage.

The inadequate heat resistance of a strongly basic exchange resin, having a quaternary ammonium salt based on an aliphatic tertiary amine, may be considered to give rise to decomposition of the quaternary ammonium salt, due to Hofmann degradation under a high temperature.

SUMMARY OF THE INVENTION

It is an object of this invention to overcome the above described problems by using imidazoles in the formation of the anion exchange groups and, moreover, carrying out resinification by the use of multifunctional epoxy compounds.

Accordingly, the process for producing anion exchange resins according to this invention is characterized in that a compound (a) having a halomethyl group and an oxirane ring in the molecule thereof is caused to react with an imidazole (b), and the modified imidazole (A) thus obtained is caused to react with a multifunctional epoxy compound (B) thereby to produce a resin.

Furthermore, the process for producing anion exchange membranes according to this invention is characterized by the steps of causing a compound (a) having a halomethyl group and an oxirane ring in the molecule thereof to react with an imidazole (b), causing the modified imidazole (A) thus obtained to react with a multifunctional epoxy compound (B), pulverizing the resin thus obtained thereby to prepare an anion exchange resin powder, forming this anion exchange resin powder together with a thermoplastic resin at a temperature at which this thermoplastic resin is plastic into a membrane form, and treating the membrane thus formed with heated water.

The principal features of utility of this invention are as follows.

Since an aliphatic tertiary amine is not used, there are no problems environmental sanitation during production and of heat stability of the product. Furthermore, the number of production process steps in small, and, moreover, each step can be readily carried out.

An essential characteristic of a strongly basic exchange resin produced by the process of this invention is its good heat resistance. More specifically, for example, when heat weight reduction was measured by means of a thermobalance, no reduction in weight whatsoever was observable up to a temperature of 260° C. Because of this heat resistance, a strongly basic exchange resin of this invention is capable of withstanding not only its use at high temperatures (for example, in ion exchange in water at a high temperature), but also the thermal conditions encountered when it is dispersed in a thermoplastic resin matrix in membrane form to produce an anion exchange membrane.

Another feature of this invention is that an anion exchange membrane produced according thereto retains the inherent ion exchange characteristic of the strongly basic exchange resin contained in dispersed state in the membrane and, moreover, possesses properties characteristic of this kind of heterogeneous ion exchange membrane, whereby the mechanical strength and pliability of the membrane are good. For this reason, the membrane can be easily handled and maintained.

A further advantageous feature of the ion exchange membrane of this invention is its good acid resistance and alkali resistance, and its selectivity does not decrease over a broad pH range. Furthermore, by putting these characteristics to practical use, this membrane can be advantageously utilized for desalting in the alkaline region, electrodialytic concentration of acidic solutions, and other applications.

The anion exchange resin according to this invention has a quaternary ammonium group and a tertiary amino group. Further, the anion exchange resin according to this invention is characterized by its relatively high imidazole content, which is at least 0.9 mole/1,000g resin, usually from 0.9 to 7.0 moles/1,000 g resin, and is preferably from 1.1 to 4.1 moles/1,000 g resin.

The nature, utility, and further features of this invention will be more clearly apparent from the following detailed description beginning with a consideration of the general aspects and features of the invention and concluding with specific examples of practice illustrating preferred embodiments of this invention.

DETAILED DESCRIPTION

1. Strongly Basic Exchange Resin

A strongly basic exchange resin in accordance with one embodiment of this invention is prepared by causing a compound, having intramolecularly a halomethyl group and an oxirane ring to react with an imidazole, thereby to form a modified imidazole and resinifying this with a multifunctional epoxy compound.

1—1. Halomethyl - Oxirane compound

The above mentioned compound having intramolecularly a halomethyl group and an oxirane ring is represented by the following formula.

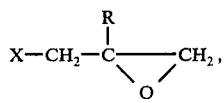
(I)

where:

X is a halogen, particularly chlorine, bromine, or iodine; and

R is a hydrogen atom or a methyl group.

Specific examples of compounds of this character are epichlorohydrin and β-methylepichlorohydrin. These compounds can be used in combinations thereof.

1-2. Imidazole

The above mentioned imidazole is represented by the following formula

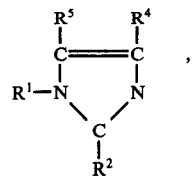
(II)

where:

$R^1$ is a hydrogen atom, a cyanoalkyl group, a triazinoalkyl group, an arylalkyl group, or an aryl group;

$R^2$ is a hydrogen atom, a $C_1$ to $C_{17}$ alkyl group, a cycloalkyl group, or an aryl group; and each of $R^4$ and $R^5$ is a hydrogen atom or a $C_1$ to $C_3$ alkyl group.

An alkyl group or an alkyl group part without dssignation of number of carbon atoms ordinarily has approximately 1 to 6 carbon atoms. Furthermore, the aryl group is ordinarily phenyl, a tolyl, or a xylyl.

Specific examples of such imidazoles are: imidazole, 2-methylimidazole, 2-ethylimidazole, 2-isopropylimidazole, 2-undecylimidazole, 2-heptadecylimidazole, 2-phenylimidazole, 2,4-dimethylimidazole, 2-ethyl-4-methylimidazole, 2-phenyl-4-methylimidazole, 1-benzyl-2-methylimidazole, 1-cyanoethyl-2-methylimidazole, 1-cyanoethyl-2,4-dimethylimidazole, 1-cyanoethyl-2-isopropylimidazole, 1-cyanoethyl-2-phenylimidazole, 1-(3,5-diamino-triazinoethyl)-2-methylimidazole, and 1-(3,5-diamino-triazinoethyl)-2-ethyl-4-methylimidazole. These imidazoles can be used in combinations thereof.

1-3. Preparation of modified imidazole

In general, when an imidazole is caused to react with a compound having intramolecularly a chloromethyl group and an oxirane ring, such as epichlorohydrin, a ring-opened, addition product is formed.

Reaction is carried out with a suitable quantity above 0.5 mole of the halomethyl -oxirance compound for each 1 mole of the imidazole.

For carrying out this reaction smoothly, an organic hydroxyl compound is added in a quantity in a range of 10 to 200 percent by weight, preferably from 30 to 150 percent by weight, with respect to the quantity of the imidazole. In addition to its function as a solvent of the imidazole, the hydroxyl compound serves also as a catalyst for the reaction for forming the modified imidazole. Furthermore, it was found that the hydroxy compound used in this process step is highly effective also as a diluent in the resinification reaction with the use of the multifunctional epoxy compound of the succeeding process step.

Examples of hydroxyl compounds exhibiting this effectiveness are: saturated monohydric alcohols having 1 to 6 carbon atoms, particularly primary alcohols, such as methanol, ethanol, propanols, and butanols; polyhydric alcohols having 2 to 5 carbon atoms such as ethylene glycol, propylene glycols, butylene glycols, glycerol, diethylene glycol, ethylene glycol monomethylether; and phenols such as phenol, cresols, xylenols, catechol, and resorcin. These hydroxy compounds can be used in combinations thereof.

1-4. Multifunctional epoxy eompound

The term "multifunctional" is herein used to designate the possession of two or more oxirane rings.

One group of multifunctional epoxy compounds suitable for use in this invention comprises those known as so-called epoxy resins of epoxy equivalent of the order of 100 to 600. Specific examples of these compounds are bisphenol epoxy resins (e.g., bisphenol A diglycidylether), novolak epoxy resins (e.g., phenol novolak glycidylether), polyphenol epoxy resins (e.g., tetrahydroxyphenylethane tetraglycidylether), polyglycol epoxy resins (e.g., glycerol triglycidylether), carboxylic acid epoxy resins (e.g., diglycidyl phthalate), amine epoxy resins (e.g., glycidylaniline), and alicyclic epoxy resins (e.g., vinylcyclohexenediepoxide). These multifunctional epoxy compounds can be used in combinations thereof.

Another group of multifunctional epoxy compounds suitable for use in this invention comprises homopolymers of and copolymers with, e.g. styrene, of an ethylenically unsaturated monomer containing a glycidyl group such as, for example, unsaturated carboxylic acid glycidyl esters, such as for example glycidyl methacrylate.

1-5. Resinification with the multifunctional epoxy compound

The heating and hardening reaction of the modified imidazole prepared as described in section 1-3. above and the multifunctional epoxy compound is carried out by uniformly mixing these two ingredients in a specific quantitative ratio and thereafter heating the mixture.

In general, the multifunctional epoxy compound is used in a quantity of 20 to 70 percent by weight, preferably 30 to 60 percent by weight of the total weight of its mixture with the modified imidazole. The heating is carried out at 60° to 190° C, preferably 70° to 180° C. The heating time is of the order of 3 to 15 hours. The hardening by heating can be carried out in the presence of a diluent. A specific example of a suitable diluent is any of the aforedescribed hydroxy compounds.

1-6. Granulation of the strongly basic exchange resin formed

By the above described reaction, lumps of a strongly basic exchange resin are produced, and these are granulated into particles of a suitable size, which is of the order of 20 to 60 mesh, preferably 20 to 48 mesh, (Tyler). In the case where a heterogeneous exchange membrane is to be produced, this particle size is preferably less than 325 mesh.

This granulation can be carried out by means of a ball mill or some other suitable pulverizing apparatus.

Still another method of pulverization utilizes a unique characteristic of the ion exchange resin according to this invention and comprises hydrating the resin lumps in a large quantity of an aqueous medium thereby to cause the lumps to undergo self-disintegration. Examples of aqueous mediums other than water are methanol and ethanol. The hydration temperature is of the order of 20° to 100° C.

After granulation, the resin is washed successively with a dilute acid (for example, an inorganic acid, e.g., hydrochloric acid, sulfuric acid, or nitric acid, of a concentration of the order of 0.05 to 2 normal) and a dilute alkali (for example, a hydroxide alkali, e.g., sodium hydroxide, potassium hydroxide, or ammonium hydroxide, of a concentration of the order of 0.05 to 2 normal), the washing sequence being immaterial, thereby to remove soluble unreacted substances. Finally, the resin is washed thoroughly with pure water, whereupon a strongly basic exchange resin of this invention in particulate state is obtained.

2. Membrane Fabrication

In accordance with one feature of this invention, the strongly basic exchange resin in powdery state obtained in the above described manner is mixed with a thermoplastic resin, and the resulting mixture is heated to a temperature at which this thermoplastic resin plasticizes and is thus formed into membrane structure. After forming, the membrane is processed with heated water.

First, for the thermoplastic resin to form the matrix, any thermoplastic resin which plasticizes at a temperature at which decomposition of the strongly basic exchange resin of the invention does not occur can be used. As mentioned hereinbefore, no thermal decomposition of the strongly basic exchange resins of the invention, in general, at temperatures up to approximately 260° C can be observed.

Specific examples of suitable thermoplastic resins are: polyolefins, for example, homopolymers and mutual copolymers of olefins such as ethylene, propylene, and butene-1; copolymers of these olefins with other ethylenically unsaturated monomers such as vinyl acetate; homopolymers and copolymers of vinyl aromatic such as a styrene; homopolymers and copolymers of methacrylic acid esters such as methyl methacrylate; homopolymers and copolymers of fluoromonomers such as tetrafluoroethylene, monochlorotrifluoroethylene, vinyl fluoride, and vinylidene fluoride; polyamides; and polyoxymethylene. These resins can be used in combinations thereof and, furthermore, can contain a suitable filler, foaming or blowing agent, stabilizer, plasticizer, coloring matter, and other auxiliary materials.

The weight ratio of the thermoplastic resin to the ion exchange resin is of the order of from 75:25 to 25:75, preferably of the order of 70:30 to 30:70.

The membrane is formed by kneading a mixture of the thermoplastic resin in a state ranging from powder to particles and the ion exchange resin in a powdery state at a temperature at which the former resin plasticizes, preferably at which it melts, for example, a temperature above 160° C in the case of a polyolefin, and forming the resulting resin into a membrane by a process such as extrusion through a T-die, extrusion by means of mixing rolls, pressurizing in a female-male mold, and casting. The membrane can be thus formed to any thickness, but the thickness is generally of the order of 0.10 to 1.0mm. The thus-produced article in membrane form is subjected to an after-treatment to yield a product having the properties of an anion exchange membrane according to this invention. The after-treatment comprises treatment of the membrane in hot water at a temperature of or above 70° C, preferably of or over 80° C. This hot water may contain an acid, an alkali, a salt, and other substances. For example, this after-treatment can be carried out by holding the membrane in an aqueous solution (at a temperature of the order of 70° to 110° C) of an alkali metal salt or an ammonium salt, for example, of a concentration of higher than 5 percent by weight, preferably higher than 7 percent by weight, for more than 20 minutes, preferably 30 to 60 minutes.

Specific examples of alkali metal salts and ammonium salts are: halides such as lithium chloride, sodium chloride, potassium chloride, rubidium chloride, cesium chloride, lithium bromide, sodium bromide, potassium bromide, rubidium bromide, cesium bromide, lithium iodide, sodium iodide, potassium iodide, rubidium iodide, cesium iodide; sulfates such as lithium sulfate, sodium sulfate, potassium sulfate, rubidium sulfate, cesium sulfate; nitrates such as lithium nitrate, sodium nitrate, potassium nitrate, rubidium nitrate, cesium nitrate; phosphate such as lithium phosphate, sodium phosphate, potassium phosphate, rubidium phosphate, cesium phosphate; acetates such as lithium acetate, sodium acetate, potassium acetate, rubidium acetate, cesium acetate; ammonium salts such as ammonium chloride, ammonium sulfate, ammonium nitrate, ammonium phosphate and ammonium acetate. These salts can be used in combinations thereof.

Upon completion of the reaction, the materials obtained are separated by filtration and suitably washed, whereupon the product of this invention is obtained.

In order to indicate more fully the nature and utility of this invention, the following examples of practice constituting preferred embodiments of the invention and a comparative example are set forth, it being understood that these examples are presented as illustrative only and are not intended to limit the scope of the invention. Parts and percents are by weight.

EXAMPLE 1

Into a four-necked flask equipped with a reflux condenser, a thermometer and a mechanical stirrer is placed 25 gram (g) of imidazole, and 25 ml. of ethanol and 5 ml. of ethylene glycol are added to produce a homogeneous mixture.

At a constant temperature of 55° to 60° C, 30 g of epichlorohydrin is added dropwise over about 30 minutes under sitrring, and the stirring is continued for a further 5 hours.

Sixty parts of the thus produced modified imidazole and 40 parts of an epoxy resin "Epikote 828" of WPE 180 produced by Shell Chemical, which is a bifunctional epoxy compound, are mixed, and the resulting homogeneous mixture is then subjected to a hardening processing which is similar to a conventional one, and which comprises heating at 70° C for 1 hour and at 150° C for 4 hours. The resulting hardened mass is allowed to cool, and the mass is then left standing in water, whereby it is easily degraded into particulate form of 20 to 60 mesh size. The time required for the degradation can be materially shortened if the degradation is carried out at an elevated temperature such as 80° C under agitation.

The resulting particulate mass is washed with 3% hydrochloric solution and then with 3% caustic soda solution thereby to remove any soluble unreacted materials. Finally, the mass is washed amply with pure water.

In actual practice, the particulate resin was found to have a salt splitting capacity of 2.0 meq/g, imidazole content of 3.1 mol/1,000 g, and a total exchange capacity of 3.9 meq/g, all on the dry basis.

In order to test the heat stability of the resin thus produced, the resin conditioned to be in the Cl-form was subjected to determination of weight loss upon heating, at a temperature raised at the rate of 10° C/min. by means of a differential thermal balance, which was a constant-temperature type differential thermal balance manufactured by Rigaku Denki, Model 8002H. No weightloss was found before the temperature reached 260° C. Weight loss under the same conditions of a commercially available strong-base exchange resin, which was based on a trimethylammonium styrene-divinylbenzene copolymer having a degree of crosslinking of 8%, Cl-form, was 13% at 200° C and 25% at 260° C.

After being treated in hot water at 90° C in air for 200 hours, the resin in accordance with the present invention conditioned to be in the Cl-form was found to have a salt splitting capacity of 1.9 meq./g, and a total exchange capacity of 3.8 meq/g, all on a dry basis. The resin thus produced had high heat stability.

EXAMPLE 2

Forty parts of the modified imidazole produced in Example 1 and 60 parts of "Epikote 828" of WPE 180 are homogeneously mixed. The homogeneous mixture thus obtained is then subjected to heat-hardening processing by the same procedure as in Example 1. After being cooled, the resulting hardened mass is ground into powder by a crusher to produce a resin in granular form. The resulting granular resin is washed with 3% hydrochloric acid solution and then with 3% caustic soda solution. Finally, the resin is washed amply with pure water. In actual practice, the resin thus obtained was found to have a neutral salt decomposition capacity of 1.5 meq/g, an imidazole content of 2.3 mol/1,000 g, and a total ion-exchange capacity of 2.6 meq/g, all on a dry basis.

EXAMPLE 3

Seven parts of "Epikote 1031" of WPE 220 produced by Shell Chemical and 38 parts of "Epikote 828" of WPE 180 are heated to produce a homogeneous mixture. To the resulting homogeneous mixture is added 55 parts of modified imidazole produced in Example 1. The resulting mixture is then subjected to the same heat-hardening processing and after-treatment as in Example 1.

In actual practice, the resin thus produced and finally washed with pure water was found to have a salt splitting capacity of 1.5 meq/g, an imidazole content of 2.4 mol/1,000 g, and a total ion-exchange capacity of 2.9 meq/g, all on a dry basis.

EXAMPLE 4

Sixty parts of the modified imidazole produced in Example 1 and 40 parts of a glycidyl methacrylatestyrene copolymer (50 : 50 by weight ratio) which is produced by a suspension polymerization method, and which is in granular form of 20 to 60 mesh size are mixed, and the resulting mixture is then subjected to a hardening processing at 70° C for 2 hours and at 150° C for 5 hours. The resulting hardened mass is allowed to cool, and the mass is then ground into granules by a crusher. The resulting granular resin is washed with 3% hydrochloric acid solution and then with 3% caustic soda solution. Finally, the resin is washed with pure water.

The resin thus produced, in actual practice was found to have a salt splitting capacity of 0.8 meq/g, an imidazole content of 1.9 mol/1,000 g, and a total exchange capacity of 1.9 meq/g, all on a dry basis.

EXAMPLE 5

Into a homogeneous mixture consisting of 29g of 2-methyl imidazole, 25 ml. of ethanol and 5 ml. of glycerol is added dropwise 10g of epichlorohydrin in the same way as in Example 1 to produce a modified methylimidazole.

Sixty parts of the thus produced modified imidazole and 40 parts of "Epikote 828" are homogeneously mixed and then subjected to the same heat-hardening processing and after-treatment as in Example 1.

In actual practice, the resulting resin thus produced and finally washed with pure water was found to have a salt splitting capacity of 1.8 meq/g, an imidazole content of 2.3 mol/1,000 g, and a total ion-exchange capacity of 3.4 meq/g, all on a dry basis.

EXAMPLE 6

Into a homogeneous mixture consisting of 39g of 2-ethyl-4-methylimidazole, 25ml. of isopropylalcohol and 5 ml. of ethyleneglycol is added dropwise 30g of epichlorohydrin in the same way as in Example 1 to produce modified 2-ethyl-4-methylimidazole.

Fifty-five parts of the thus produced modified imidazole and 45 parts of "Epikote 828" are homogeneously mixed, and then subjected to the same heat-hardening processing and after-treatment as in Example 1.

The resulting resin thus produced and finally washed with pure water in actual practice was found to have a salt splitting capacity of 1.3 meq/g, an imidazole content of 2.1 mol/1,000g, and a total ion-exchange capacity of 1.9 meq/g, all on a dry basis.

EXAMPLE 7

Into a homogeneous mixture consisting of 48g of 1-cyanoethyl-2-methylimidazole, 25 ml. of ethanol and 5 ml. of ethylenglycol is added dropwise 30g of epichlorohydrin in the same way as in Example 1 to produce a modified 1-cyanoethyl-2-methylimidazole.

Sixty parts of the thus produced modified compound and 40 parts of "Epikote 828" are homogeneously mixed, and then subjected to the same heat-hardening processing and after-treatment as in Example 1.

The resulting resin thus produced and finally washed with pure water in practice was found to have a neutral salt decomposition capacity of 1.0 meq/g, an imidazole content of 2.1 mol/1,000 g, and a total ion-exchange capacity of 2.0 meq/g, all on a dry basis.

EXAMPLE 8

(a) An Example of Production of Ion-Exchange Resin

Into a four-necked flask equipped with a reflux condenser, a thermometer and a mechanical stirrer is placed 25g of imidazole, and 25 ml. of ethanol and 5 ml, of ethyleneglycol are added to produce a homogeneous mixture.

At a constant temperature of 55° to 60° C, 30 g of epichlorohydrin is added dropwise over about 30 minutes under stirring, and the stirring is continued for 5 hours.

Sixty parts of the thus produced modified imidazole and 40 parts of an epoxy resin "Epikote 828" of WPE 180 produced by Shell Chemical, which is a bifunctional epoxy compound, are mixed, and the resulting homogeneous mixture is then subjected to hardening processing which is similar to a conventional one and which comprises heating at 70° C for 1 hour and at 150° C for 4 hours. The resulting hardened mass is allowed to cool, and then left standing in water, whereby it is easily degraded into particulate form.

The resulting particulate mass is washed with 3% hydrochloric acid solution and then 3% caustic soda solution thereby to remove any soluble unreacted materials. Finally, the mass is washed amply with pure water. After being dried the thus produced resin is ground into powder of 325 mesh by a vibrating mill.

In actual practice, the thus comminuted resin was found to have a salt splitting capacity of 2.0 meq/g, an imidazole content of 3.1 mol/1,000 g, a total ion-exchange capacity of 3.9 meq/g, all on a dry basis.

This comminuted resin is designated hereinafter as powder ion-exchange resin (A).

(b) An Example for Producing Heterogeneous Anion-Exchange Membrane

To 60 parts of the above powder anion-exchange resin (A) is added 40 parts of polypropylene resin powder of MI (Melt Index)6, and then these materials are mixed thoroughly under agitation. At about 180° C, the resulting mixture is rolled by means of a roll kneading machine and then formed by a press at 200° C under a pressure of 100 kg/cm$^2$. The resultant mixture is allowed to cool to produce a membrane (B).

The thus produced membrane (B) is dipped into a saturated sodium chloride aqueous solution at 100° C for 30 minutes to produce a heterogeneous anion-exchange membrane.

(c) Characteristics of the Thus Formed Exchange Membrane

In practice, the salt splitting capacity, thickness, ion transport number and specific resistance of the above obtained anion-exchange membrane were 1.2 meq/g, on dry basis, 0.50mm, 0.92 and 120 Ω-cm, respectively.

In order to test the acid resistance and alkali resistance of the membrane thus produced, specimens thereof were dipped in 0.5N NaCl solution adjusted to pH 12 with caustic soda and in 0.5N NaCl solution adjusted to pH 3 with hydrochloric acid at room temperature for 30 days, respectively, and the resulting membranes were then subjected to determination of ion transport number and specific resistance in both NaCl solutions of pH 12 and pH 3, respectively. The ion transport number and specific resistance of the membrane dipped in pH 12 NaCl solution were found to be 0.82 and 140 Ω-cm, respectively, while they were respectively 0.85 and 140 Ω-cm for the membrane dipped in pH 3 NaCl solution. The membranes in accordance with the present invention were thus found to be excellent in their resistance to alkalis and acids.

The ion transport numbers were calculated from the membrane potential, which was generated across the two sodium chloride aqueous solutions, which were 0.5N and 0.005N solutions respectively, and which were separated by the membrane which was in advance dipped in 0.2525N sodium chloride aqueous solution for over 8 hours.

On the other hand, the specific resistance ratio was represented by the electric resistance value (Ω-cm) of the membrane when 1000 cycles of alternating electric current was caused to flow across the membrane, dipped in 0.5N sodium chloride aqueous solution, which membrane was in advance dipped in 0.5N sodium chloride aqueous solution for over 8 hours.

Comparative Example 1

(a) Production of Heterogeneous Anion-Exchange Membrane from Commercially Available Strong-Base Exchange Resin Sixty parts of powdery anion-exchange resin which was produced by comminuting into 325 mesh size or below by a vibrating mill, a commercially available styrene-based strong-base exchange resin "Dia Ion PA 316" produced by Mitsubishi Kasei, whose salt splitting capacity was 1.45 meq/g, on a dry basis, and 40 parts of polypropylene resin of MI 6 were mixed, and the resulting mixture was then subjected to the same forming and after-treatment processing as in Example 8.

(b) Characteristics of the thus formed Exchange Membrane

The salt splitting capacity, thickness, ion transport number and specific resistance of the anion-exchange membrane thus produced were 0.2 meq/g, on a dry basis, 0.5mm, 0.93 and 1200 Ω-cm, respectively. This showed that the above exchange membrane did not have good electrical characteristics.

EXAMPLE 9

Fifty parts of the powdery anion-exchange resin (A) produced in Example 8 and 50 parts of high density polyethylene of MI5 were mixed, and the resulting mixture was then subjected to the same forming processing as in Example 8 to produce a membrane.

The thus produced membrane was then dipped in hot water of 95° C for 30 minutes to produce a heterogeneous anion-exchange membrane.

The salt splitting capacity, thickness, ion transport number and specific resistance of the anion-exchange membrane thus produced were 1.0 meq/g, on dry basis, 0.55mm, 0.85, 90 Ω-cm, respectively.

EXAMPLES 10 to 13

The membrane (B) produced in Example 8 was dipped in 20% alkali metallic salt aqueous solutions and 20% ammonium salt aqueous solution as hereinafter shown in Table 1 at 100° C for 30 minutes to produce a heterogeneous anion-exchange membrane.

The thickness, ion transport number and specific resistance of the heterogeneous anion-exchange membrane thus produced were respectively as set forth in Table 1.

Table 1

| Example | Example 10 | Example 11 | Example 12 | Example 13 |
|---|---|---|---|---|
| Alkali metal salt and ammonium salt | Potassium chloride | Sodium carbonate | Sodium sulfate | Ammonium sulfate |
| Thickness (mm) | 0.50 | 0.50 | 0.50 | 0.50 |
| Ion transport number | 0.93 | 0.94 | 0.91 | 0.91 |
| Specific resistance (Ω-cm) | 125 | 190 | 170 | 150 |

EXAMPLE 14

(a) Production of Ion-Exchange Resin

Into a homogeneous solution consisting of 29g of 2-methylimidazole, 25 ml. of ethanol and 5 ml. of glycerol is added dropwise 30g of epichlorohydrin in the same way as in Example 8 to produce a modified imidazole.

Sixty parts of the thus produced modified imidazole and 40 parts of "Epikote 828" are mixed, and the resulting homogeneous mixture is then subjected to heat-hardening and after-treatment processings in the same way as in Example 8.

The resin thus produced and finally washed with pure water is dried, and then comminuted into 325 mesh or below by a vibrating mill.

The thus comminuted resin in actual practice was found to have a salt splitting capacity of 1.8 meq/g, an imidazole content of 2.3 mol/1,000 g, and a total ion-exchange capacity of 3.4 meq/g, all on dry basis. This comminuted resin is designated hereinafter as powder resin (C).

(b) Production of Heterogeneous Anion-Exchange Membrane

Sixty parts of the above powdery anion resin (C) and 40 parts of polypropylene resin powder of MI 6 are mixed, and the resulting mixture is then subjected to forming processing and after-treatment processing in the same way as in Example 8.

In actual practice, the anion-exchange membrane thus produced was found to have a salt splitting capacity of 1.1 meq/g on dry basis, a thickness of 0.54mm, an ion transport number of 0.92, and a specific resistance of 195 Ω-cm.

The words "imidazole content" are used to indicate the content of the imidazole compound (2) in the resin, and the content is calculated from the nitrogen atom content which in turn is determined by elemental analysis.

We claim:

1. A process for producing an anion-exchange resin which comprises reacting a compound (1) having a halomethyl group and an oxirane ring in the molecule thereof with an imidazole compound (2), and reacting the modified imidazole thus obtained with a polyfunctional epoxy compound (3) thereby to produce a resin which has an imidazole content of at least 0.9 mole per 1,000g of the resin.

2. The process as claimed in claim 1 in which the compound (1) has the formula:

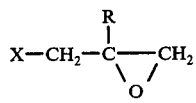

where X is a halogen, and R is a member selected from the group consisting of hydrogen and methyl.

3. The process as claimed in claim 2 in which the compound (1) is epichlorohydrin.

4. The process as claimed in claim 1 in which the compound (2) has the formula:

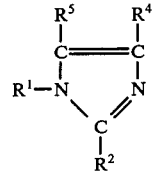

wherein $R^1$ is a member selected from the group consisting of hydrogen, a cyanoalkyl, a triazinoalkyl, an arylalkyl and an aryl, $R^2$ is a member selected from the group consisting of hydrogen, a $C_1$ - $C_{17}$ alkyl, a cycloalkyl and an aryl, each of $R^4$ and $R^5$ is a member selected from the group consisting of hydrogen and a $C_1$ - $C_3$ alkyl.

5. The process as claimed in claim 4 in which the alkyl group which may be $R^2$ has from 1 to 6 carbon atoms and the aryl group is a member selected from phenyl, tolyl and xylyl.

6. The process as claimed in claim 1 in which the compound (2) is imidazole, 2-methylimidazole, 2-ethyl- 4-methylimidazole, or 1-cyanoethyl-2-methylimidazole.

7. The process as claimed in claim 1 in which the poly-functional epoxy compound (3) is an epoxy resin which has at least two oxirane rings and which has an epoxy equivalent of from 100 to 600.

8. The process as claimed in claim 7 in which the epoxy resin is a product of bisphenol A and an epihalohydrin.

9. The process as claimed in claim 1 in which the reaction of the compound (1) and the imidazole compound (2) is effected in the presence of an organic hydroxyl compound.

10. The process as claimed in claim 9 in which the organic hydroxyl compound is a member selected from the group consisting of a saturated monohydric alcohol of 1 to 6 carbon atoms, a polyhydric alcohol of 2 to 5 carbon atoms, and a phenol compound.

11. The process as claimed in claim 1 in which the resin obtained is hydrated in an aqueous medium to be self-degraded into a granular form.

12. The process as claimed in claim 1 in which the resin obtained is washed with a dilute acid, a diluted alkali and water.

* * * * *